(12) United States Patent
Shen

(10) Patent No.: US 10,926,216 B2
(45) Date of Patent: *Feb. 23, 2021

(54) COMPOSITION FOR CONTROLLING AMBIENT HUMIDITY

(71) Applicant: SHANGHAI HENGYUAN MACROMOLECULAR MATERIALS CO., LTD., Shanghai (CN)

(72) Inventor: Sandra Shen, Shanghai (CN)

(73) Assignee: SHANGHAI HENGYUAN MACROMOLECULAR MATERIALS CO., LTD, Shanghai (CN)

( * ) Notice: Subject to any disclaimer, the term of this patent is extended or adjusted under 35 U.S.C. 154(b) by 253 days.

This patent is subject to a terminal disclaimer.

(21) Appl. No.: 16/084,976

(22) PCT Filed: Jul. 20, 2018

(86) PCT No.: PCT/CN2018/096464
§ 371 (c)(1),
(2) Date: Sep. 14, 2018

(87) PCT Pub. No.: WO2020/000543
PCT Pub. Date: Jan. 2, 2020

(65) Prior Publication Data
US 2020/0298177 A1    Sep. 24, 2020

(30) Foreign Application Priority Data

Jun. 29, 2018 (CN) .......................... 201810699621.1

(51) Int. Cl.
*B01D 53/28* (2006.01)
*F24F 11/00* (2018.01)

(52) U.S. Cl.
CPC .......... *B01D 53/28* (2013.01); *F24F 11/0008* (2013.01); *B01D 2252/103* (2013.01); *B01D 2252/2025* (2013.01); *B01D 2252/504* (2013.01)

(58) Field of Classification Search
CPC .................................................... B01D 53/28
See application file for complete search history.

(56) References Cited

U.S. PATENT DOCUMENTS

| 5,691,293 A * | 11/1997 | Kruse ..................... C11D 1/667 510/224 |
| 5,846,450 A * | 12/1998 | Atkinson ............... C09K 5/047 252/69 |
| 8,748,723 B1 * | 6/2014 | Egberg ..................... G10G 7/00 84/453 |
| 2003/0205694 A1 * | 11/2003 | Sapienza .................. C09K 5/20 252/70 |

* cited by examiner

*Primary Examiner* — Peter F Godenschwager
(74) *Attorney, Agent, or Firm* — Im IP Law; Chai Im; C. Andrew Im

(57) ABSTRACT

A composition for controlling ambient humidity within 55%-68%. The composition includes water and at least one of citrate, lactate and formate. The citrate includes at least one of sodium citrate, potassium citrate and calcium citrate. The lactate includes at least one of sodium lactate and potassium lactate. The formate includes at least one of sodium formate and potassium formate. The weight percentage of each of the citrate, the lactate and formate in the composition is 33.3%-84.2%. The total weight percentage of the citrate, the lactate and the formate in the composition is 33.3%-84.2%. The composition can control the ambient humidity within 55%-68% without the need to pre-adjust the objective space. The composition has large capacity of moisture absorption and desorption, and can quickly achieve the desired humidity in the objective environment.

1 Claim, No Drawings

COMPOSITION FOR CONTROLLING AMBIENT HUMIDITY

RELATED APPLICATIONS

This application is a § 371 application from PCT/CN2018/096464 filed Jul. 20, 2018, which claims priority from Chinese Patent Application No. 201810699621.1 filed Jun. 29, 2018, each of which is herein incorporated by reference in its entirety.

FIELD OF THE INVENTION

The present invention relates specifically to a composition for controlling ambient humidity.

BACKGROUND OF THE INVENTION

"Humidity" is an important factor that affects product packaging and storage life in all walks of life. Each product requires a reasonable humidity range to store. For example, the humidity to store Chinese herbal medicine is about 55%-68%, the ambient humidity below the numerical value will increase the loss of the Chinese herbal medicine and reduce the quality of the Chinese herbal medicine, and the ambient humidity above the numerical value will cause the Chinese herbal medicine to rot, resulting in the deterioration of the Chinese herbal medicine and the failure to use them. The humidity to store some food in dry storage room is about 55%-68%, and the ambient humidity below the numerical value will reduce the quality of the food. The ambient humidity above the numerical value will cause food to rot and even cause food poisoning.

In order to control the ambient humidity within 55%-68%, the common method is to use humidity control silica gel to control the ambient humidity. However, the use of humidity control silica gel is not in line with green products. During the manufacture of humidity control silica gel, a lot of wastewater will be produced. In order to protect the environment, many silicone raw material factories are closed for rectification. This has led various industries to start to comprise desiccant product, which is the least important in the original list of materials table, in the procurement list of important materials.

Therefore, there is an urgent need for an alternative to humidity control silica gel, and the alternative must be in line with the green and environment theme.

SUMMARY OF THE INVENTION

The present invention is made for solving the above problems and aims to provide a composition for use in controlling ambient humidity.

The present invention provides a composition for use in controlling ambient humidity within 55%-68%, comprising: water and at least one of citrate, lactate and formate. Wherein the citrate comprises at least one of sodium citrate, potassium citrate and calcium citrate, the lactate comprises at least one of sodium lactate and potassium lactate, the formate comprises at least one of sodium formate, potassium formate, the weight percentage of the citrate in the composition is 33.3%-84.2%, the weight percentage of the lactate in the composition is 33.3%-84.2%, the weight percentage of the formate in the composition is 33.3%-84.2%, the total weight percentage of the citrate, the lactate and the formate in the composition is 33.3%-84.2%.

Further, the composition for use in controlling ambient humidity can also have the following features: wherein the composition for use in controlling ambient humidity comprises one of the citrate, the citrate is sodium citrate, the weight percentage of the citrate in the composition is 33.3%-84.2%.

Further, the composition for use in controlling ambient humidity can also have the following features: wherein the composition for use in controlling ambient humidity comprises one of the lactate, the lactate is sodium lactate, the weight percentage of the lactate in the composition is 33.3%-84.2%.

Further, the composition for use in controlling ambient humidity can also have the following features: wherein the composition for use in controlling ambient humidity comprises the formate and any one of the citrate and the lactate, the weight percentage of the formate in the composition is 25%-52.6%, the weight percentage of the citrate in the composition is 8.3%-31.6%, the weight percentage of the lactate in the composition is 8.3%-31.6%.

Further, the composition for use in controlling ambient humidity can also have the following features: wherein the weight percentage of the formate in the composition is 32.7%-41.0%, the weight percentage of the citrate in the composition is 12%-20%, the weight percentage of the lactate in the composition is 12%-20%.

Further, the composition for use in controlling ambient humidity can also have the following features: wherein the composition for use in controlling ambient humidity comprises the formate, the citrate and the lactate, the weight percentage of the formate in the composition is 25%-52.6%, the weight percentage of the citrate in the composition is 3%-15.3%, the weight percentage of the lactate in the composition is 5%-25.3%, the total weight percentage of the citrate and the lactate in the composition is 8.3%-31.6%.

The Effect of the Present Invention

The composition for use in controlling ambient humidity according to the present invention comprises: water and at least one of citrate, lactate and formate. Wherein the citrate comprises at least one of sodium citrate, potassium citrate and calcium citrate, the lactate comprises at least one of sodium lactate and potassium lactate, the formate comprises at least one of sodium formate, potassium formate, the weight percentage of the citrate in the composition is 33.3%-84.2%, the weight percentage of the lactate in the composition is 33.3%-84.2%, the weight percentage of the formate in the composition is 33.3%-84.2%, the total weight percentage of the citrate, the lactate and the formate in the composition is 33.3%-84.2%. Therefore, the composition for use in controlling ambient humidity of the present invention can control the ambient humidity within 55%-68%, does not need to pre-adjust the objective space, has large capacity of moisture absorption and desorption and can quickly achieve the desired humidity in the objective environment.

Moreover, since the composition for use in controlling ambient humidity of the present invention comprises only citrate, lactate and formate in common, the composition manufactured by using the citrate, lactate and formate is not only cheap, but also safe for human body when manufacturing, environment and the objects to be preserved. In addition, the composition is not only friendly to the natural environment in the manufacturing process, but also friendly to the natural environment after being discarded.

DETAILED DESCRIPTION OF THE PREFERRED EMBODIMENTS

Embodiment 1

The composition for use in controlling ambient humidity within 55%-68% comprises citrate and water. The citrate is sodium citrate, the weight percentage of sodium citrate in the composition is 33.3%-84.2%.

The purity of the sodium citrate is not less than 99.9%. The water is deionized water.

Embodiment 2

The composition for use in controlling ambient humidity within 55%-68% comprises lactate and water. The lactate is sodium lactate, the weight percentage of sodium lactate in the composition is 33.3%-84.2%.

The purity of the sodium lactate is not less than 99.9%. The water is deionized water.

Embodiment 3

The composition for use in controlling ambient humidity within 55%-68% comprises citrate, formate and water. The citrate is sodium citrate, the formate is sodium formate.

The weight percentage of sodium formate in the composition is 25%-52.6%.

The weight percentage of sodium citrate in the composition is 8.3%-31.6%.

The purity of the sodium formate and sodium citrate is not less than 99.9%. The water is deionized water.

Embodiment 4

The composition for use in controlling ambient humidity within 55%-68% comprises citrate, formate and water. The citrate is sodium citrate, the formate is sodium formate.

The weight percentage of sodium formate in the composition is 32.7%-41.0%.

The weight percentage of sodium citrate in the composition is 12%-20%.

The purity of the sodium formate and sodium citrate is not less than 99.9%. The water is deionized water.

Embodiment 5

The composition for use in controlling ambient humidity within 55%-68% comprises lactate, formate and water. The lactate is potassium lactate, the formate is sodium formate.

The weight percentage of sodium formate in the composition is 25.0%-52.6%.

The weight percentage of potassium lactate in the composition is 8.3%-31.6%.

The purity of the sodium formate and potassium lactate is not less than 99.9%. The water is deionized water.

Embodiment 6

The composition for use in controlling ambient humidity within 55%-68% comprises lactate, formate and water. The lactate is sodium lactate, the formate is potassium formate.

The weight percentage of potassium formate in the composition is 25.0%-52.6%.

The weight percentage of sodium lactate in the composition is 8.3%-31.6%.

The purity of the potassium formate and sodium lactate is not less than 99.9%. The water is deionized water.

Embodiment 7

The composition for use in controlling ambient humidity within 55%-68% comprises citrate, lactate, formate and water. The citrate is potassium citrate, the lactate is sodium lactate, the formate is potassium formate.

The weight percentage of potassium formate in the composition is 25.0%-52.6%.

The weight percentage of potassium citrate in the composition is 3%-15.3%.

The weight percentage of sodium lactate in the composition is 5%-25.3%.

The total weight percentage of citrate and lactate in the composition is 8.3%-31.6%.

The purity of the potassium citrate, sodium lactate and potassium formate is not less than 99.9%. The water is deionized water.

Embodiment 8

The composition for use in controlling ambient humidity within 55%-68% comprises formate and water. The formate is sodium formate.

The weight percentage of sodium formate in the composition is 33.3%-84.2%.

The purity of the sodium formate is not less than 99.9%. The water is deionized water.

Take the embodiment 4 as an example, the weight percentage of sodium lactate, glycerol and water in the composition for controlling different humidity, respectively is

| Ambient humidity (%) | Sodium citrate (%) | Sodium formate(%) | $H_2O$ (%) |
|---|---|---|---|
| 68 | 32.7 | 18.7 | 48.6 |
| 63 | 35 | 20 | 45 |
| 60 | 40 | 12 | 48 |
| 55 | 41 | 12 | 47 |

The Effect of the Embodiments

The composition for use in controlling ambient humidity according to the foregoing embodiments comprises water and at least one of citrate, lactate and formate. Wherein the citrate comprises at least one of sodium citrate, potassium citrate and calcium citrate, the lactate comprises at least one of sodium lactate and potassium lactate, the formate comprises at least one of sodium formate and potassium formate, the weight percentage of the citrate in the composition is 33.3%-84.2%, the weight percentage of the lactate in the composition is 33.3%-84.2%, the weight percentage of the formate in the composition is 33.3%-84.2%, the total weight percentage of the citrate, the lactate and the formate in the composition is 33.3%-84.2%. Therefore, the composition for use in controlling ambient humidity of the foregoing embodiments can control the ambient humidity within 55%-68%, does not need to pre-adjust the objective space, has large capacity of moisture absorption and desorption and can quickly achieve the desired humidity in the objective environment.

Moreover, since the composition for use in controlling ambient humidity of the foregoing embodiments comprises only citrate, lactate and formate in common, the composition manufactured by using the citrate, lactate and formate is not only cheap, but also safe for human body when manufacturing, environment and the objects to be preserved. In addition, the composition is not only friendly to the natural environment in the manufacturing process, but also friendly to the natural environment after being discarded.

The foregoing embodiments are preferred cases of the present invention and is not used to limit the scope of protection of the present invention.

The invention claimed is:

1. A composition for controlling ambient humidity within 55%-68%, comprising:
   water, a formate, a citrate and a lactate;
   wherein the citrate comprises at least one of sodium citrate, potassium citrate and calcium citrate;
   wherein the lactate comprises at least one of sodium lactate and potassium lactate;
   wherein the formate comprises at least one of sodium formate, potassium formate;
   a weight percentage of the formate in the composition is 25%-52.6%;
   a weight percentage of the citrate in the composition is 3%-15.3%;
   a weight percentage of the lactate in the composition is 5%-25.3%;
   a total weight percentage of the citrate and the lactate in the composition is 8.3%-31.6%; and
   a total weight percentage of the citrate, the lactate and the formate in the composition is 33.3%-84.2%.

* * * * *